United States Patent
Park

(10) Patent No.: US 8,701,587 B2
(45) Date of Patent: Apr. 22, 2014

(54) PRECISE CRITICAL TEMPERATURE INDICATOR (AND MANUFACTURING METHODS THEREFOR)

(75) Inventor: Ji Hoon Park, Suwon (KR)

(73) Assignee: Intellectual Discovery, Inc., Seoul (KR)

( * ) Notice: Subject to any disclaimer, the term of this patent is extended or adjusted under 35 U.S.C. 154(b) by 341 days.

(21) Appl. No.: 13/142,015

(22) PCT Filed: Dec. 24, 2009

(86) PCT No.: PCT/KR2009/007774
§ 371 (c)(1),
(2), (4) Date: Jul. 21, 2011

(87) PCT Pub. No.: WO2010/074529
PCT Pub. Date: Jul. 1, 2010

(65) Prior Publication Data
US 2011/0271895 A1   Nov. 10, 2011

(30) Foreign Application Priority Data

Dec. 24, 2008 (KR) .................. 10-2008-0133228
Dec. 23, 2009 (KR) .................. 10-2009-0129853

(51) Int. Cl.
*G01K 11/06* (2006.01)
*G01K 11/12* (2006.01)

(52) U.S. Cl.
USPC ............................ 116/219; 374/102; 374/160

(58) Field of Classification Search
USPC ................. 116/216, 217, 218, 219, 206, 207; 374/106, 160, 161, 162
See application file for complete search history.

(56) References Cited

U.S. PATENT DOCUMENTS

| | | | |
|---|---|---|---|
| 2,614,430 A | | 10/1952 | Manske |
| 3,954,011 A | * | 5/1976 | Manske .................. 374/102 |
| 3,958,528 A | | 5/1976 | Hill |
| 3,962,920 A | | 6/1976 | Manske |
| 4,064,872 A | | 12/1977 | Caplan |
| 4,233,801 A | | 11/1980 | Watt |
| 4,408,557 A | | 10/1983 | Bradley et al. |
| 4,793,717 A | * | 12/1988 | Manske .................. 374/160 |
| 4,996,104 A | | 2/1991 | Nicholas et al. |
| 5,102,233 A | | 4/1992 | Staerk et al. |
| 5,120,137 A | | 6/1992 | Ou-Yang |
| 5,282,684 A | | 2/1994 | Holzer |
| 5,368,905 A | * | 11/1994 | Ohno .................... 428/34.1 |
| 5,667,303 A | * | 9/1997 | Arens et al. ............ 374/102 |

(Continued)

FOREIGN PATENT DOCUMENTS

| JP | 50060262 | 5/1975 |
|---|---|---|
| JP | 52-3479 | 1/1977 |

(Continued)

*Primary Examiner* — Richard A Smith

(74) *Attorney, Agent, or Firm* — Rothwell, Figg, Ernst & Manbeck, P.C.

(57) ABSTRACT

According to a precise critical temperature indicator and a control method thereof of the present invention, the precise critical temperature indicator comprises as one body: a blocking boundary layer which is positioned between a spreading material member including an operation button and spreading medium members including a spreadable area for a spreading material; and a temperature sensor which is controlled and operated as the spreading material passes through the blocking boundary layer and contacts the spreading medium member according to a user's pressing of the operation button. As a result, operation of the temperature sensor is easily controlled using the operation button.

12 Claims, 12 Drawing Sheets

(56) References Cited

U.S. PATENT DOCUMENTS

| | | |
|---|---|---|
| 5,997,964 A | 12/1999 | Klima, Jr. |
| 6,042,264 A * | 3/2000 | Prusik et al. .................. 374/106 |
| 6,270,122 B1 * | 8/2001 | Shadle et al. .................. 283/95 |
| 6,378,454 B1 * | 4/2002 | Massi ........................... 116/219 |
| 6,741,523 B1 * | 5/2004 | Bommarito et al. .......... 368/327 |
| 6,896,296 B2 * | 5/2005 | Shadle et al. .................. 283/95 |
| 6,957,623 B2 | 10/2005 | Guisinger et al. |
| 6,968,804 B1 * | 11/2005 | Barbieri et al. ............... 116/219 |
| 7,232,253 B2 | 6/2007 | Isbitsky |
| 8,061,294 B2 * | 11/2011 | Suda et al. .................... 116/216 |
| 2004/0240324 A1 | 12/2004 | Isbitsky et al. |
| 2007/0245947 A1* | 10/2007 | Riemelmoser ................ 116/217 |
| 2013/0220209 A1* | 8/2013 | Rabinowitz et al. .......... 116/206 |

FOREIGN PATENT DOCUMENTS

| | | | | |
|---|---|---|---|---|
| JP | 59-122921 | 7/1984 | | |
| JP | 61-15532 | 1/1986 | | |
| JP | 01-116421 | 5/1989 | | |
| JP | 04294386 | 10/1992 | | |
| JP | 6-50826 | 2/1994 | | |
| JP | 06050827 A * | 2/1994 | ............. | G01K 11/06 |
| JP | 07151613 A * | 6/1995 | ............. | G01K 11/06 |
| JP | 08043214 A * | 2/1996 | ............. | G01K 11/06 |
| JP | 09323765 | 12/1997 | | |
| JP | 10267761 | 10/1998 | | |
| JP | 2002181635 | 6/2002 | | |
| JP | 2002365145 | 12/2002 | | |
| JP | 2004257828 | 9/2004 | | |
| JP | 2005-308239 | 11/2005 | | |
| JP | 2008145126 A * | 6/2008 | ............. | G01K 11/06 |
| KR | 10/2003/0082364 | 10/2003 | | |
| KR | 10/2005/0074008 | 7/2005 | | |
| WO | WO 03/077227 | 9/2003 | | |
| WO | WO 2007/148321 | 12/2007 | | |
| WO | PCT/KR2009/006088 | 10/2009 | | |
| WO | WO 2009130831 A1 * | 10/2009 | ............. | G01K 11/06 |
| WO | PCT/KR2009/007774 | 12/2009 | | |
| WO | WO 2010/047527 | 4/2010 | | |
| WO | WO 2010/074529 A | 7/2010 | | |

* cited by examiner

PRECISE CRITICAL TEMPERATURE INDICATOR (AND MANUFACTURING METHODS THEREFOR)

CROSS REFERENCE TO RELATED APPLICATION

This is a 35 U.S.C. §371 application of, and claims priority to, International Application No. PCT/KR2009/007774, which was filed on Dec. 24, 2009, and which claims priority to Korean Patent Application No. 10-2008-0133228, which was filed on Dec. 24, 2008, and to Korean Patent Application No. 10-2009-0129853, which was filed on Dec. 23, 2009, the teachings of each application is incorporated herein by reference.

TECHNICAL FIELD

The present invention relates to a critical temperature indicator, in particular to a precise critical temperature indicator comprising an activation button filling up a development material therein, a development material member forming a migration passage of the development material and a development medium member forming a development portion of the development material with being coupled to the development material member in the non-contact state to enable the convenient operation control of a temperature sensor by the activation button and the confirmation of the exact temperature sensing indication, and a manufacturing method therefor.

BACKGROUND TECHNOLOGY

There has been a critical temperature indicator of a typical prior art that can be obtained as a commercial name "Monitor Mark" of 3M.

As shown in FIG. 1, the critical temperature indicator 10 includes an indicating material or development material layer 11 to reacted or diffused at or above a predetermined temperature and a wicking member or a development medium layer 12 absorbing a solvent from the development material layer 11. The development material layer 11 is a temperature sensor layer mixed with ink and fatty acid or paraffin, and the development medium layer 12 is made of absorbing papers, non-woven fibers, etc. A barrier or isolation layer 13 is placed between the development material layer 11 and the development medium layer 12. A first major sheet or supporting layer 14 and an opposing second major sheet or both sided-adhesive tape 15 are in turn arranged on the lower portion of the development material layer 11. An indicating layer 16 includes indication windows to be arranged on the development medium layer 12, in which the indication windows includes larger indicating windows 16' and smaller indication windows 16" formed in a longitudinal direction thereon. A transparent coating layer 17 is positioned on the right of the indication layer 16.

On the other hand, the development medium layer 12, the indication layer 16 and the transparent layer 17 are provided with cutting portions 18 having the same size, respectively, on the same position of their one side. The temperature indicator 10 further includes a supporting layer 14 attached to the both sided-adhesive tape 15, on which the development material layer 11 and the development medium layer 12 are arranged on the supporting layer 14 with the isolation layer 13 positioned there between. An indication layer 16 is placed on a separation layer 13 with indication windows 16' and 16" being positioned on the development medium layer 12. Then, the transparent layer 17 is positioned on the indication layer 16 to finish the assembly of the temperature indicator 10.

Therefore, the temperature indicator 10 is attached to a predetermined position of a refrigeration product through the adhesive portion of the both sided-adhesive tape 15, the cutting portion 18 is removed there from and the isolation layer 13 is drawn out between the development material layer 11 and the development medium layer 12 to be closely contacted with each other. Thereafter, the temperature indicator 10 begins to operate as the development material 11 including a fluid of fat or paraffin with a pigment ink is melted, infiltrated into the development medium layer 12 and immigrated along the lengthwise thereof to indicate the storage state of the products through the indication windows 16' and 16".

But the temperature indicator has disadvantages in that the resultant product size is relatively bigger due to the migration of the development material in a longitudinal direction, requires a larger power of attention for removing the cutting layer between the development material layer and the development medium and layer. It is difficult to automate the manufacturing of the product. Since the development material is stored in a state exposed to the air atmosphere without being sealed, it must be refrigerated or cooled for over one to two hours below a melting point thereof before being used. If it is carelessly used and melted at the state exposed to a normal temperature, some fluid of the development material adheres to the isolation layer when the isolation layer is removed. Particularly, the development material is slowly migrated as being gradually far away from the starting point. For it, such like strip type of the temperature indicator has a disadvantage in that an error ranges of the temperature indication time is relatively greater.

Another typical prior art of U.S. Pat. No. 7,232,253 (US Unexamined Publication No. 2004/0240324 published on Dec. 2, 2004) discloses "A time indicator and method of manufacturing same". The time indicator comprises a first reservoir, a migration medium and activating means for bringing liquid from the first reservoir in contact with the migration medium so that after activation the liquid migrates through the migration medium producing a color change therein. The activating means comprises a second reservoir connected between the first reservoir and the migration medium whereby after activation the liquid travels relatively rapidly from the first reservoir to the second reservoir and then migrates relatively slowly along the length of the migration medium over time.

The patent has some characteristics in that it can make a visible indication of the product life span, but the development material liquefied is migrated to a liquid conduit and then activated in a longitudinal direction with being contacted with the migration medium, so it is resulted in forming the dual paths. It means that it is difficult to measure the exact time elapse. Furthermore, as a weak seal is provided to block the liquid conduit, the activation means of a dish shape portion including a first storing portion must be broken out by a certain force for the operating of a system. However, the weak seal has been often used to be ruptured due to the carelessness of users in operation to draw out the liquid outside therefrom. For it, the time indicator makes the confirmation of the exposed time to a cooling environment become difficult.

Considering these and those points, it is preferable if a critical temperature indicator has an operative mechanism to enable the confirmation of the administration situation from the delivery to the changing of products Also, it is preferable if it is convenient to use a critical temperature indicator and the critical temperature indicator is easily adapted to a small freeze or refrigerating product and has a simple configuration to enable the mass-production thereof.

DETAILED DESCRIPTION OF THE INVENTION

Technical Problem

Considering these points, a main object of the invention is to provide a precise critical temperature indicator made into one body to enable the contact between an upper development material member and lower development medium member to be arbitrarily controlled, and manufacturing method therefor.

Another object of the invention is to provide a precise critical temperature indicator made into one body comprising an activation button filling up a development material therein and a development material member forming a migration passage of the development material in dual to enable the confirmation of the exact temperature sensing indication, and manufacturing method therefor.

Another object of the invention is to provide a precise critical temperature indicator for enabling the contact of an activation button filling up a development material therein with a development medium member formed at a separated state there from to be arbitrarily controlled and manufacturing method therefor.

Another object of the invention is to provide a precise critical temperature indicator having a configuration to simply separate a development material member and a development medium member from each other to establish the automatic mass-production thereof and the distribution and storage at a normal temperature thereby enabling the convenient handling thereof, and manufacturing method therefor.

Means for Resolving Problems

According to one embodiment of the invention, a precise critical temperature indicator comprises a development material member including an activation button filling up a development material and constituted as a molding layer projected at the center, an extension portion horizontally extended from the activation button and forming a migration passage of the development material on the diameter line thereof, a first compartment bordering at a concentric circle with the activation button on the extension portion and applying an adhesive agent to the outer circumference thereof, a second compartment projecting in a concentric circle adjacent to the circumference of the first compartment to form a predetermined space therein and an upper portion extended from the circumference of the second compartment and forming at least one indicating window; a development medium member positioned on the lower surface of the upper portion and including a migration passage of the development material formed in a region of any one of a concentric circle, a threaded form or a zigzag form; and a lower portion including a seat for sealing the upper portion adjacent to the development medium member.

A manufacturing method of the precise critical temperature indicator comprises steps of preparing an upper sheet comprising a plurality of development material members including an activation button formed in a predetermined semi-hemisphere on a single sheet and forming first and second compartments and a passage; filling up a development material into the activation button, the first compartment and the passage; overlapping a lower sheet including a plurality of development medium members on another single sheet and combining them; and applying a synthetic ink such as a polyester ink, etc. to a predetermined shape of first and second print layers to form a development material contacting portion and a development material mitigation passage.

According to another embodiment of the invention, a precise critical temperature indicator comprises a temperature sensor including an upper portion made of a transparent material, in which the upper portion includes a container sealed by a seal member to receive a development material therein, a support portion supporting the container, first and second cylindrical portions formed in layers of concentric circle having diameters different from each other, a first cylindrical portion including a circular plate formed away in a certain gap from the circumference thereof, a second cylindrical portion receiving the container therein and a lower portion including a development medium member for arranging the support portion on a seat portion under the lower surface of the upper portion and sealing the lower surface thereof adjacent to the development medium member and applying an adhesive agent thereto to be attached to freezing and refrigerating products; an indication portion made of an opaque material and including at least one indication windows formed on the cylindrical portion of the upper portion; and a cap portion made of an opaque material and sealing the lower surface thereof, in which the activation button is fitted into the center hole thereof and the temperature sensor is received therein.

The temperature sensor furthermore includes the support portion positioned on around the circular seat portion of the development medium member and an extension portion extended in a circle or multi-angle forms from the seat portion, to the upper and lower surfaces of which a predetermined pigment is applied.

According to another embodiment of the invention, a precise critical temperature indicator comprises a development material member including an activation button filling up a development material therein and constituted as a molding layer projected in a semi-sphere at the center and a plurality of indication windows formed in an arc on the circumference of the activation button; and a development medium member including a boundary layer positioned between the development material member and the development medium member and for forming a speed adjustment window and an migration passage connected to the speed adjustment window of the development of the development material, in which the development material is introduced into and filled in the speed adjustment window by the activation button, and migrated along a migration passage of the development medium member coupled with both sides thereof, thereby indicating a critical temperature detection through a plurality of indication windows formed on the predetermined positions of the development material member.

An adhesive agent is not applied to regions corresponding to the activation button and the speed adjustment window on an adhesive agent layer between the development material member and the boundary layer. The development medium member made of a micro porous film is heat-pressed in the form of a circle ring with a region formed by overlapping the migration passage of the development material with the speed adjustment window and an indication portion region formed adjacent to the migration passage on the diameter line of the speed adjustment window.

The precise critical temperature indicator furthermore comprises a print layer printing regions corresponding to the speed adjustment window, and the indication windows of the indication portion are printed by a red color, both sides on the red color of the indication window are printed by a yellow color, and other region is printed by a blue color thereby to let the operating start time point and the exposure time point of the critical temperature to be indicated.

According to another embodiment of the invention, a manufacturing method of a precise critical temperature indicator comprises steps of firstly, preparing a seal sheet made of a silver film and including a plurality of base layers, a print sheet member for the temperature indication, a development medium member sheet made of a micro porous film and including a plurality of development medium members forming the development passage and an intermediate member sheet including a plurality of boundary layers to form the speed adjustment windows, respectively; heat-depositing these sheets by the reference of the heat-adhesion portion forming the development passage to combine them in a single sheet; applying an adhesive agent to all portions of the combined sheet except for an inner circle portion of the development passage of the development material on a plurality of intermediate members and indication windows; and heat-depositing on the adhesive layer a sheet including a plurality of development material members having a molding layer in the form of a semi-sphere to receive the development material.

According to another embodiment of the invention, a precise critical temperature indicator comprises a development material member including an activation button made into a molding layer to be projected in a semi-sphere from the center thereof and for receiving a development material, an migration passage horizontally extended in a predetermined distance from the activation button of the molding layer, a buffer portion connected to the migration passage and made into a compartment to receive the development material, temporally, and absorb shock due to the pressing force of the activation button and a plurality of indication windows formed in an arc on the circumference of the activation button; a boundary layer including a speed adjustment window connected to the migration passage and for introduce the development material into the speed adjustment window; a development medium member made of a micro porous film and for forming a region except for the development passage extended from the migration passage into a heat-adhesion portion; a print layer printing regions corresponding to the speed adjustment window and the indication window of the indication portion are printed by a red color, both sides on the red color of the indication window by a yellow color, and other region by a blue color; a base layer positioned on the bottom of a system, thereby letting the operating start time point and the exposure time point of the critical temperature to be indicated on the indication windows on the top of the system.

The development material member includes the indication window formed in the form of a circle or a square, etc. on the circumference of the activation button, a development passage having a shape the same as that of the indication window horizontally extended toward an outlet at the center from the activation button to let the development material to be flowed there into and a buffer portions including at least one compartments connected to the development passage to receive the development material, first, and absorb some shock due to the pressing force of the activation button.

According to another embodiment of the invention, a manufacturing method of a precise critical temperature indicator comprises steps of preparing a seal sheet including a plurality of base layers made of a silver foil, a print member sheet including a plurality of print members for a temperature indication, a development medium sheet including a plurality of development medium members forming development passages made of a micro porous film, an intermediate member sheet including a plurality of boundary layers forming a speed adjustment window, respectively; heat-depositing these sheets by the reference of heat-deposition portions forming the development passages of the development material to be combined in a single sheet; applying an adhesive agent to all portions except for the inner circle portion of the development passages and indication windows on a plurality of boundary layers of the combined sheet; and heat-depositing on the adhesive layer a sheet including a plurality of development material members and constituted as a molding layer in a semi-sphere to receive the development material at the center thereof, a migration passage horizontally extended in a predetermined distance from the activation button of the molding layer, a buffer portion connected to the migration passage and made into a compartment to receive the development material, temporally, and absorb shock due to the pressing force of the activation button and a plurality of indication windows formed in an arc on the circumference of the activation button.

Effect of the Invention

According to the invention, a precise critical temperature indicator can be stored with a development material member and a development medium being separated from each other in a normal state and introduce the development material into a development passage or a buffer portion to buffer some shock in order to control a force applied to a development material in use and does not require for cooling it below a critical temperature before use.

BEST MODE FOR CARRYING OUT INVENTION

Figure 1:
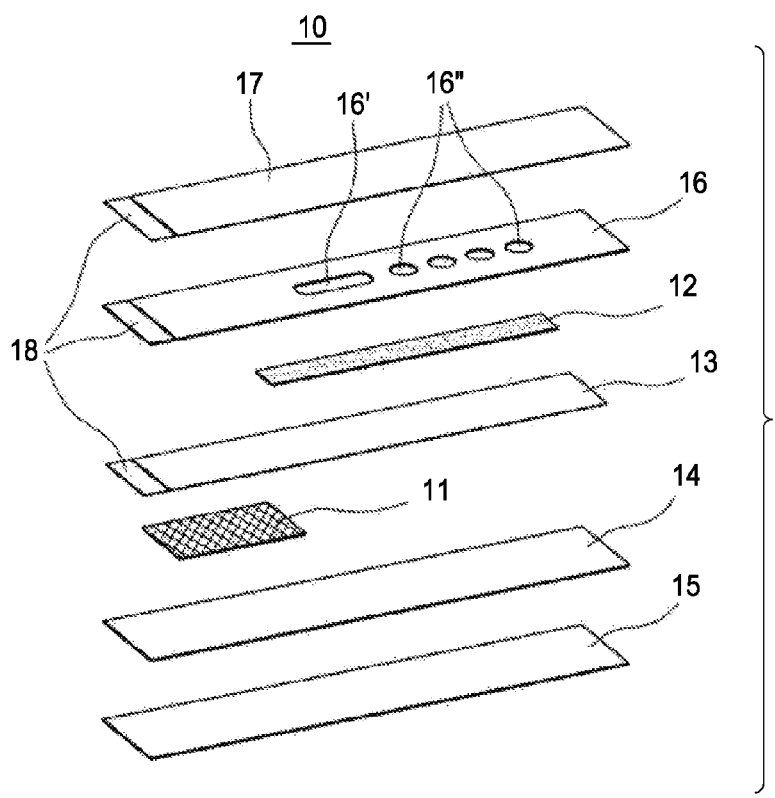
FIG. 1 is an exploded perspective view illustrating an example of a prior art in detail.
Figure 2:
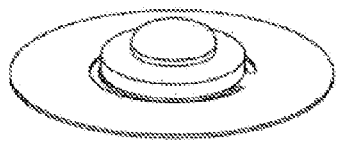
FIGS. 2 and 3 are respectively a perspective view and an exploded perspective view illustrating a temperature and the assembly thereof according to one embodiment of the invention.
Figure 3:
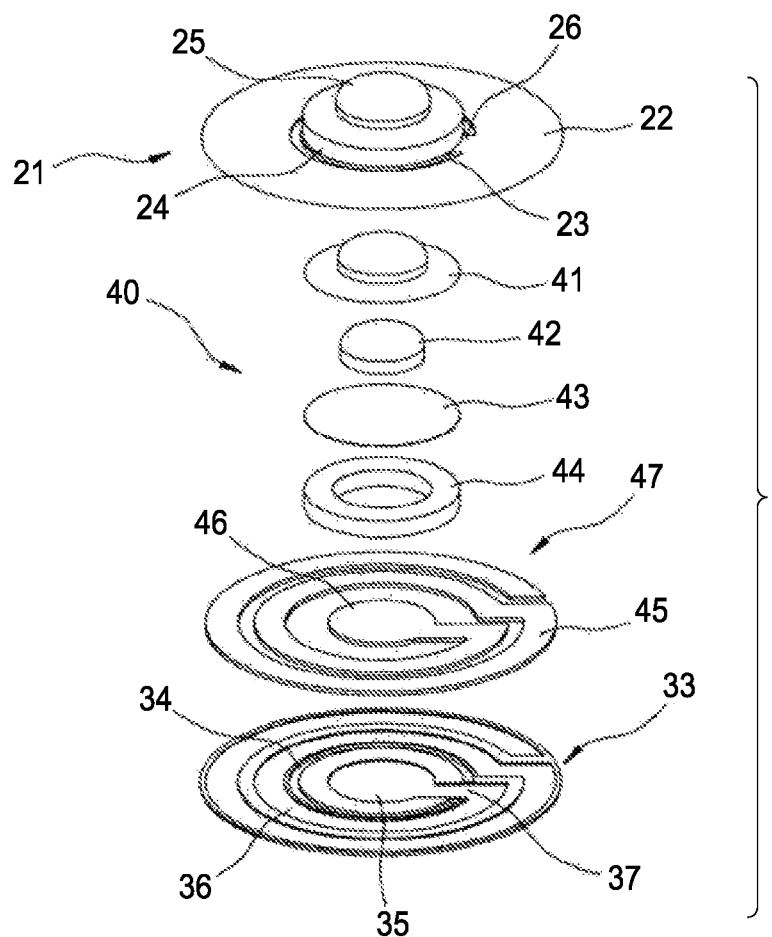

The invention will be explained in detail with reference to the attached drawings as follows:

According to one embodiment of the invention, a precise critical temperature indicator 20 is made into one body as shown FIG. 2 and comprises an upper portion 21 and a lower portion 33 made of a transparent PTP or a vinyl coating film forming a case as shown in FIG. 3. Herein, the PTP is generally used in packing medical supplies in the form of a tablet or a jelly and an abbreviation of Press Through Pack called "Blister Pack".

The upper portion 21 includes a first cylindrical portion 24 and a second cylindrical portion 25 integrally stratified in a concentric circle having two diameters different from each other, in which the first cylindrical portion 24 includes a first circle plate 22 formed away in a predetermined gap 23 except for a first connection portion 26 from the circumference thereof A lower portion 33 also is made by PTP or Vinyl film and formed in the same shape as that of the plane view of the upper portion 21.

The lower portion 33 includes a center portion 35 having an area similar or equal to that of the first cylindrical portion 24, a second circle plate 36 identical to the first circle plate 22 away in a second gap 34 from the circumference of the center portion 35 and a second connection portion 37 corresponding to the first connection portion 26. Herein, the first gap 23 and the second gap 34 let a projection portion 72 of a cap portion 71 to be passed there through as described in detail later with reference to FIG. 8.

There is a temperature sensing portion 40 arranged between the upper portion 21 and the lower portion 33. The temperature sensing portion 40 includes a container 41 of a material such as PTP positioned in the second cylindrical portion 25. The container 41 receives a development material 42 such as fat acid ester or silicon oil to be melted over a critical temperature and is sealed at the lower portion by a seal member 43. The seal member 43 is made of fragile materials such as a silver foil to be broken down, as the development material member 130 is moved downward by pressing the second cylindrical portion 25 or an activation button 55 as described later.

A development medium 47 is positioned adjacent to the lower portion 33 under the container 41 and made of an absorbing paper or a non-woven fiber. A seat portion 46 is formed at the center to position the development material 42. An extension portion 45 is extended in a concentric circle or threaded form to secure a predetermined length from one side of the seat portion 46. The extension portion 45 may be a circle or polygonal form. Also, in the extension portion 45 of the development medium 47 a dyestuff or pigment is attached to the upper or lower portion thereof As the development material 42 is migrated along the extension portion 45, the dyestuff is dissolved to dye the development medium 47.

Before the operating of the temperature sensing portion 40, the support portion 44 is positioned around the seat portion 46 of the development medium 47 to support the container 41 together with the sealing member 43.

Such like temperature sensing portion 40 includes a first indication portion 51 of an opaque material with indication windows 53, 63 and 73 formed on the upper and a cap portion 61 or 71, a fixing portion 52 including the lower surface and a lower structure 62 or a container cover 76 to function as an independent precise critical temperature indicator.

Therefore, the temperature sensor can be used, separately or variably, according to a use place and object as it will be known in embodiments below.

Figure 4:
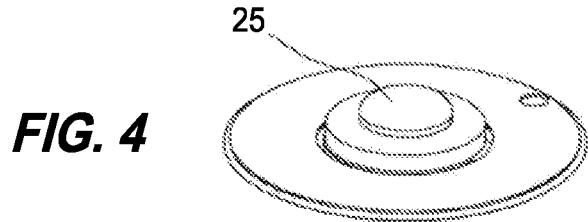
FIGS. 4 and 5 are perspective views illustrating a temperature sensor and a precise critical temperature indicator including a fixing portion thereto according to one embodiment of the invention.
Figure 5:
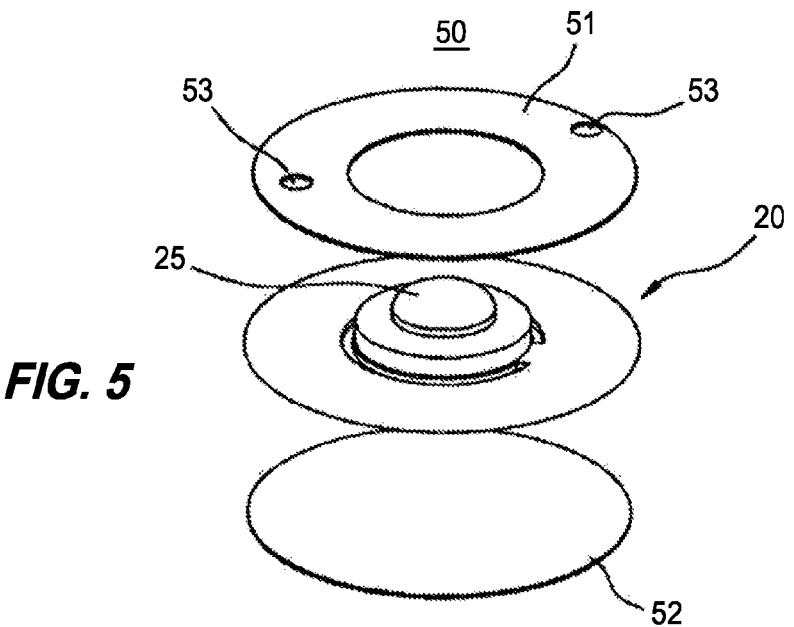

As shown in FIGS. 4 and 5, according to other embodiment of the invention, a precise critical temperature indicator 50 is assembled into one body. The precise critical temperature indicator 50 includes a first indication portion 51 made of an opaque material on the upper surface of a temperature sensor 20, a fixing portion 52 formed as a both-sided tape to both surfaces of which an adhesive is applied and a temperature sensor 20 positioned therebetween. The first indication portion 51 includes at least one first indication windows 53 formed on the circumference thereof The first indication portion 51 may be printed by an opaque paint on the first circle plate 22 of the temperature sensor 20 in order to form the first indication window 53 without constructing as a separate structure.

The precise critical temperature indicator 50 is operated in a manner to press the second cylindrical portion 25 downward and then insert the development material 42 into the center hollow of the support portion 44 in the state of attaching to a freezing or refrigerating product thereby to activate the temperature sensor 20. At that time, the seal member 43 is broken down, and the development material 42 is positioned on the seat portion 46 of the development medium 47. In this state, the development material 42 is melted at over a critical temperature, the melted liquid of which is developed or migrated on the extension portion 45 of the development medium 47. And then, the dyestuff applied to the lower and upper portions of the development medium 47 is dissolved migrated or revealed along the development medium 47. The revealed position is moved according to the time elapse at over the critical temperature. As a predetermined time is elapsed, the revealed color appears on the first indication window 53 to judge the current state of a stored product.

Figure 6:
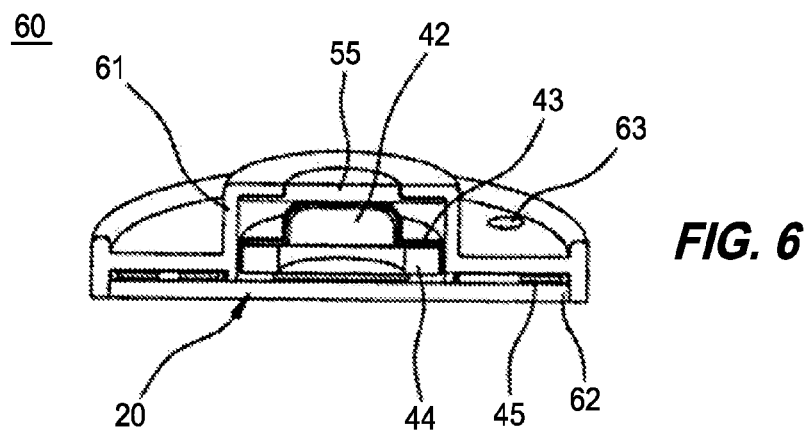
FIGS. 6 and 7 are perspective views illustrating a precise critical temperature indicator including a temperature sensor, a cap portion and a lower structure mounted thereto and the operation thereof according to one embodiment of the invention.
Figure 7:
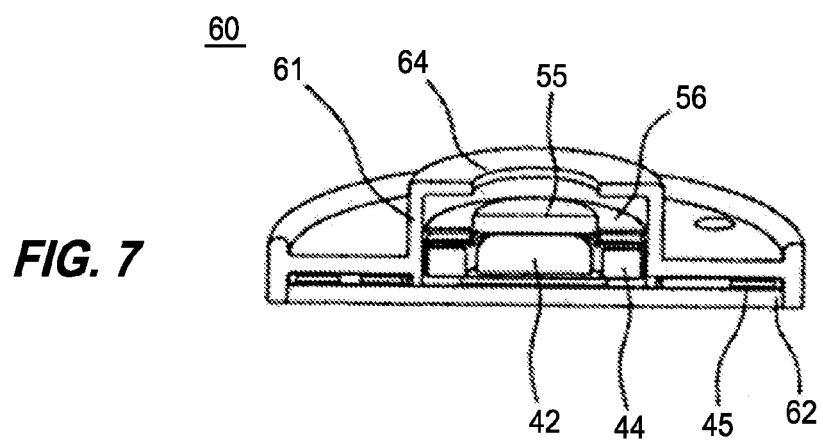

Also, according to another embodiment of the invention, as shown in FIGS. 6 and 7, a precise critical temperature indicator 60 comprises a temperature sensor 20, and the temperature sensor 20 is assembled into a cap portion 61 and a lower structure 62 made of a rigid plastic.

The cap portion 61 made of an opaque rigid material includes an activation button 55 fitted into a center hole 64 on the upper portion thereof, under the lower portion of which a temperature sensor 20 is positioned. The activation button 55 includes a flange 56 formed on the lower portion thereof, which is positioned on a second cylindrical portion 25 while on the inner surface of the cap portion 61 to be exposed through the center hole 64 in the assembly thereof. The cap portion 61 is opened at the lower portion to let the temperature sensor 20 to be assembled therein and the lower structure 62 to be mounted on the lower surface thereof. The second indication window 63 is formed on a predetermined position of the upper surface of the cap portion 61.

The precise critical temperature indicator 60 has a configuration equal to that of another embodiment of the precise critical temperature indicator 50 except for the portions as described above.

Figure 8:
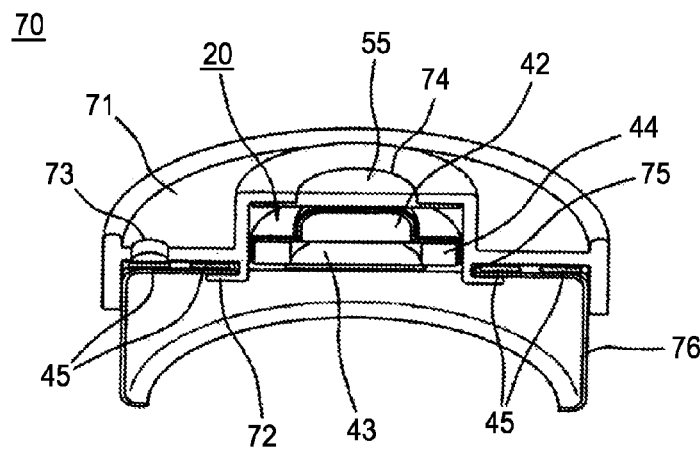
FIG. 8 is a cross-sectional view illustrating a precise critical temperature indicator adapted to a cover of a medicine bottles such as a vial.

According to another embodiment of the invention, as shown in FIG. 8, a precise critical temperature indicator 70 includes a precise critical temperature sensor 20 adaptable to a container cover 76 such as an injection medicine bottle or a medicine vial, etc.

In other words, the cap portion 71 includes projections 72 extended from the fixing position around the circumference of a cylindrical portion at the center portion thereof. The projections 72 are projected into cover holes 75 formed on a container cover 76 and then bent in any direction of left and right sides to combine the cap portion 71 and the container cover 76 with each other. A third indication window 73 is formed at a predetermined position on the upper surface of the cap portion 71. A hole 74 is formed on a thickness portion of the cap portion 71 to fit the activation button 55 there into.

A whole configuration excluding from parts described above is similar or equal to that of the precise critical temperature indicator 70, the detailed description of which is deleted.

Figure 9:
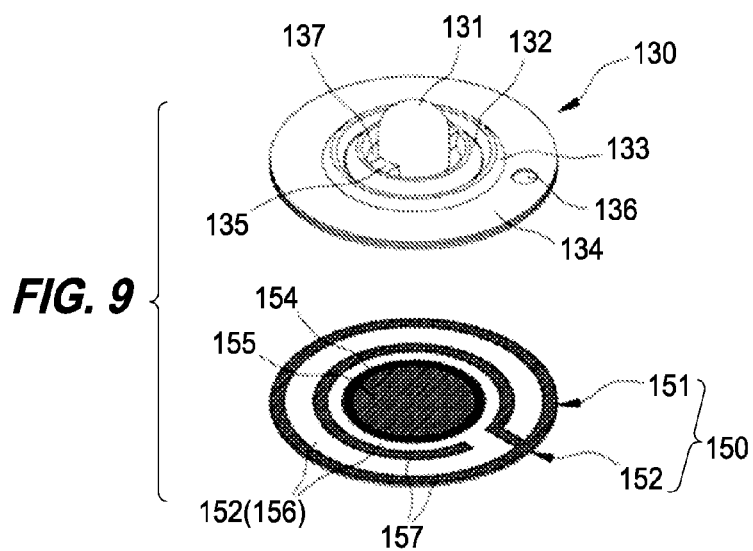
FIGS. 9, 10 and 11 are respectively a schematic perspective view and exploded perspective views illustrating the assembly of a precise critical temperature indicator according to another embodiment of the invention.
Figure 10:
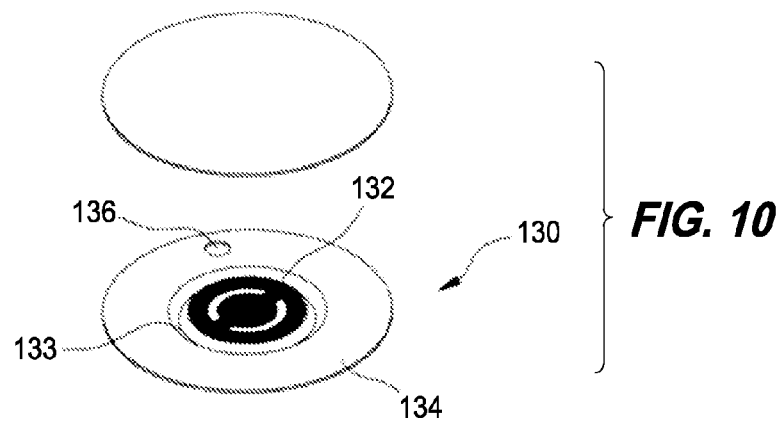

According to another embodiment of the invention, as shown in FIGS. 9 and 10, a precise critical temperature indicator 20 comprises a development material member 130 including an upper portion made of a transparent PTP or a vinyl coating film for forming a case and a development medium member 150 including a lower portion that a development material is migrated.

The development material member 130 comprises an activation button 131 including a cap portion like a similar sphere or semi-sphere in the form of a dome, a first compartment 132 formed to position in concentric circles of two different diameternes spaced away from the activation button 131, passages 135 connected from the activation button 131 to a second compartment 133, the second compartment 133 and an indication window 136 formed away in a distance from the circumference of the second compartment 136. A development material 140 is filled up in the activation button 131, the passages 135 and the first compartment 132. An extension portion 137 is referred to a portion formed except for passages 135 between the activation button 131 and the first compartment 132, which is adhered to a development medium 151 of a development medium member 150 using a heat, an ultrasonic wave or a bond, etc.

Figure 11:
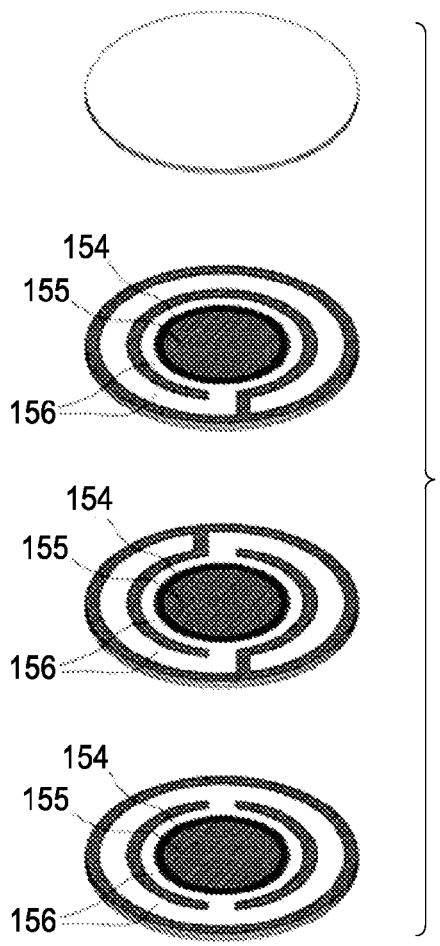

The development medium member 150 includes the development medium 151 and a base portion 152 coupled to the development material member 130 adjacent thereto and for protecting the development medium 151. The development medium 151 is formed to contact to the activation button 131, the first compartment 132 and a first development material contact portion 155 including a passage as described below. A first print layer 154 defines a boundary portion between the first and second compartments 132 and 133 adjacent to the circumference of the first development material contact portion 15, and the boundary portion applying adhesives is coupled with the first and second compartments 132 and 133 according to a method as described below. Furthermore, the second development material contact portion 153 includes development material migration passages 156 formed in at least one concentric circle in a predetermined form by a second print layer 157 as shown in FIGS. 9 and 11. The second print layer 157 is coupled with the outer circumference of the second compartment 133 on the inner side and the lower portion of the development material member 130 on the outer side.

Herein, the first and second print layers 154 and 157 are formed using Polyester ink, Silicon ink, Urethane ink, PVC ink, Nylon ink, Epoxy ink, etc. Also, instead of the first and second print layers 154 and 157, a silica coated sheet or a filter paper is usable cutting in a predetermined form with a forming knife. The development material may be fat acid oil or paraffin and silicon oils that fat-solubility pigments are dissolved.

Figure 12:
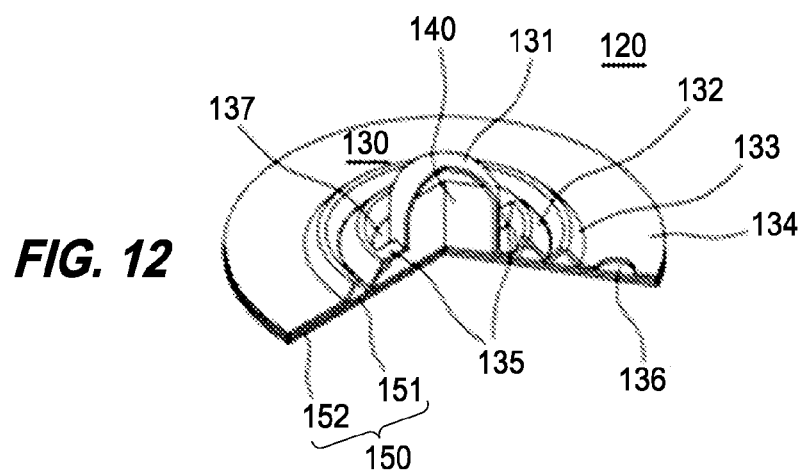
FIGS. 12 and 13 are respectively perspective views illustrating the assembly of a precise critical temperature indicator and the inner structure thereof cut in part and the operation state thereof as an activation button is pressed in use according to another embodiment of the invention.
Figure 13:
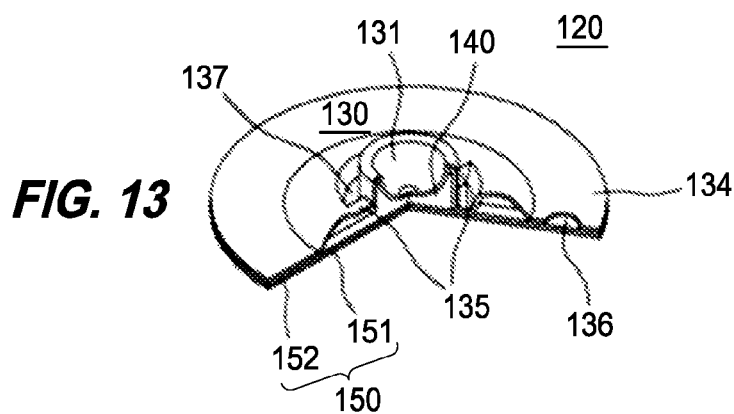

As shown in FIGS. 12 and 13, a precise critical temperature indicator 120 comprises a development material member 130 and a development medium member 150 coupled to each other. The development material member 130 includes an activation button 131 and a migration passage 135 and a first compartment 132 filled up with a development material 140, in which a boundary portion between the first compartment 132 and a second compartment 133 is adhered to a first print layer 154, and the second compartment 133 is hollow. The circumference of the second compartment 133 is adhered to the second print layer 157. Besides, all portions of the development material member 130, an extension portion 137 and a circumferential portion 134 extended from the second compartment 133 are adhered to each another using a heat, an ultrasonic wave or a bond, etc.

Herein, it is noted that a temperature sensor includes the first and second compartments 132 and 133 isolating the development material 140 from the development medium 151 only for a moment and the development medium migration passage 156 formed by the first and second print layers 154 and 157 on the development medium 151.

Figure 14:
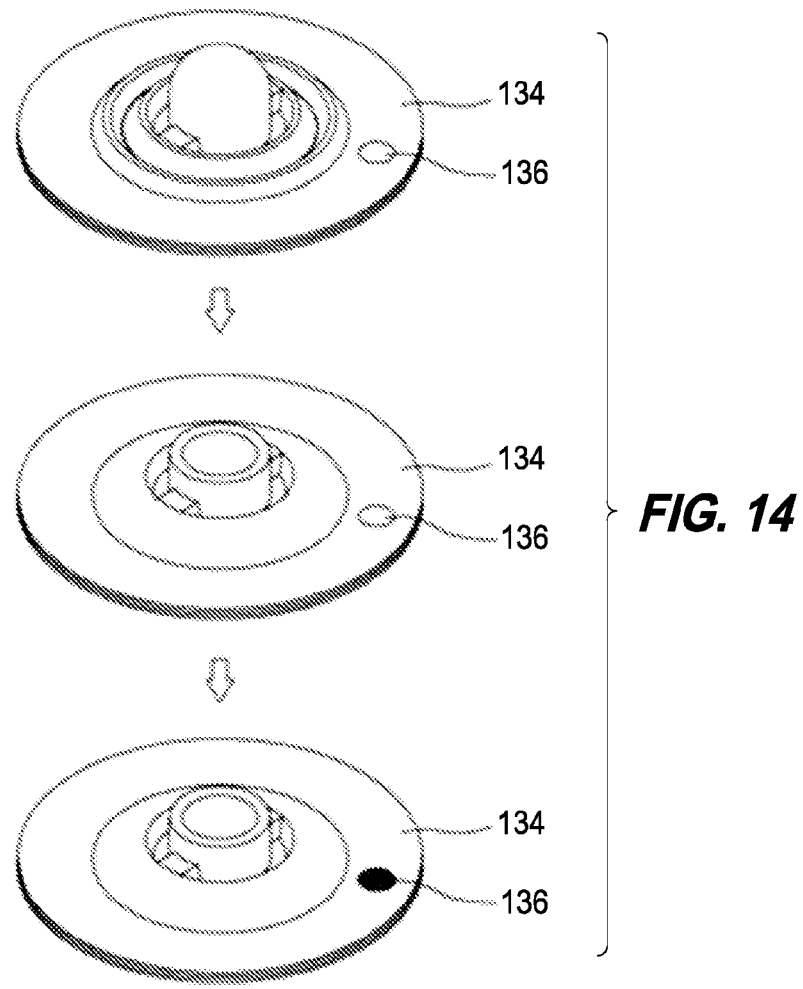
FIGS. 14, 15 and 16 are respectively perspective views illustrating the operations of a precise critical temperature indicator with the shapes of indication windows being different from each other according to another embodiment of the invention.
Figure 15:
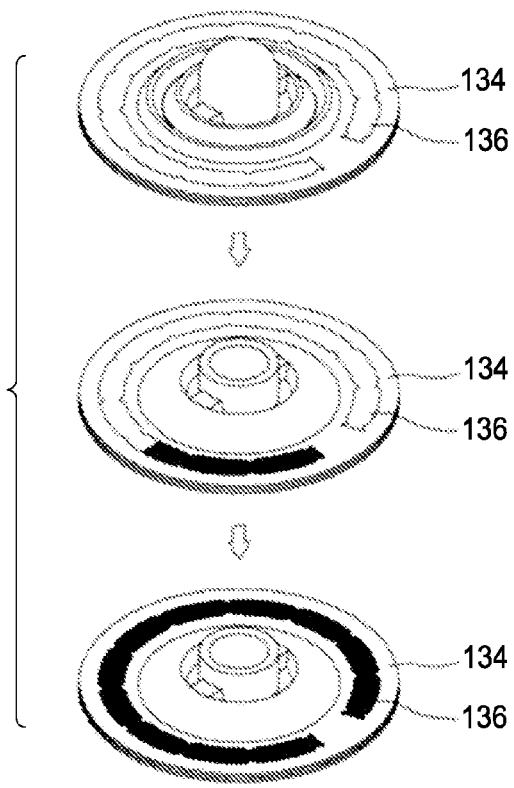
Figure 16:
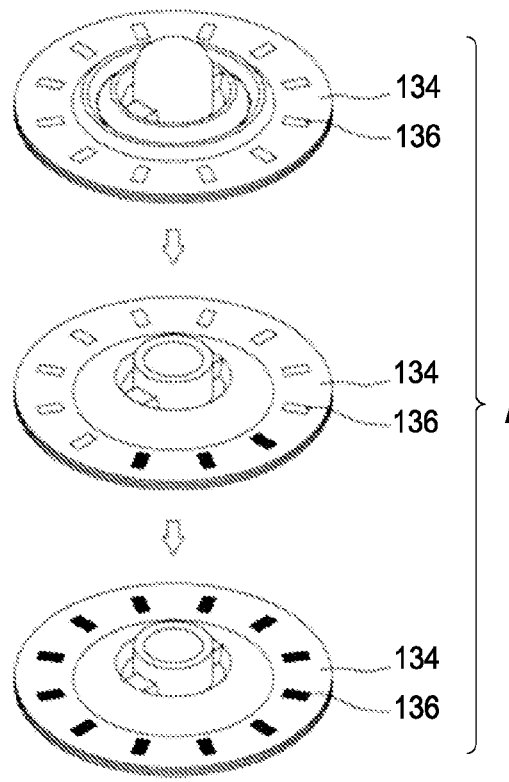

The precise critical temperature indicator including such like this temperature sensor is operated as the activation button 131 is first pressed, and the adhesion of the boundary portions between the first print layer 154 and the first and second compartments 132 and 133 is released. The development material 140 is migrated to the second compartment 133 to be filled up there into and thereafter along the development medium migration passage 156 to let the indication window 136 to appear at a predetermined color after a predetermined time elapse as shown in FIG. 14. The indication window 136 may be numerously formed along the development medium migration passage 156 in an arc on the circumferential portion 134 to enable the migration of the development material 140 to be confirmed as shown in FIG. 15. As shown in FIG. 16, a plurality of the indication windows 136 are formed away in a distance from each other along the development medium migration passage 156 in an arc on the circumferential portion 134 to enable the migration of the development material 140 to be confirmed.

Figure 17:
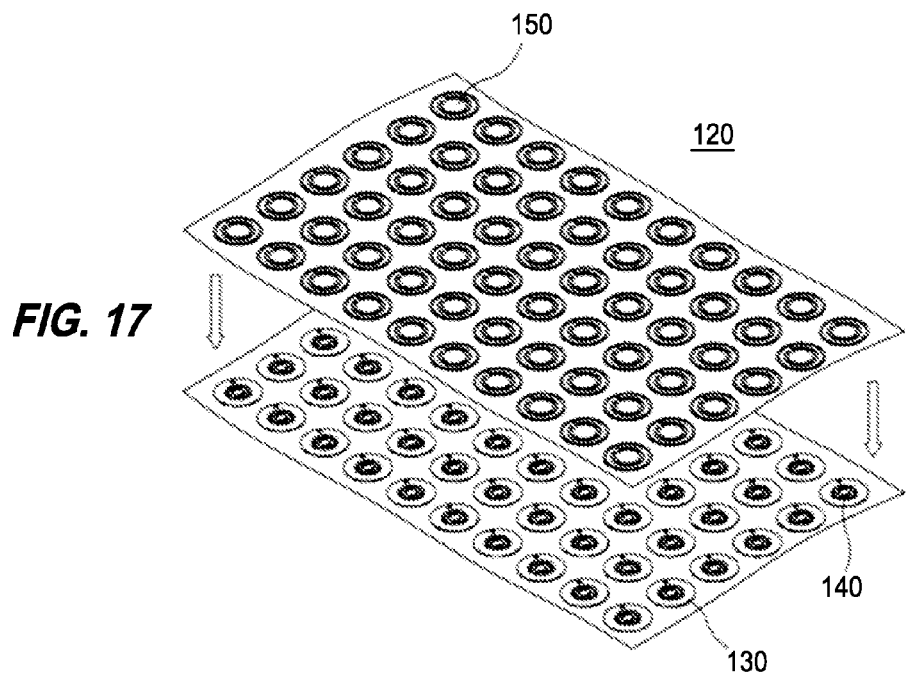
FIG. 17 is a view illustrating a method of manufacturing a larger amount of a precise critical temperature indicator, automatically, according to another embodiment of the invention.

As shown in FIG. 17, according to another embodiment of the invention, a precise critical temperature indicator is manufactured as follows: firstly, a sheet having a plurality of development material member 130 using a single sheet made of materials such as a blister, etc. is prepared. A development material 140 is filled up into an activation button, a first compartment and a passage on the development material member 130. Another sheet is coupled with the development material member 130 overlapping to each other. First and second print layers are printed using a synthetic ink such as a polyester ink, etc. to form a development material contact portion and a development material migration passage. And, on the development material member 130 a development medium member 150 is positioned and integrally coupled with each other using a heat, an ultrasonic wave or adhesive.

Thereafter, such like a mass manufactured precise critical temperature indicators at once are separated one by one to complete one product.

Figure 18:
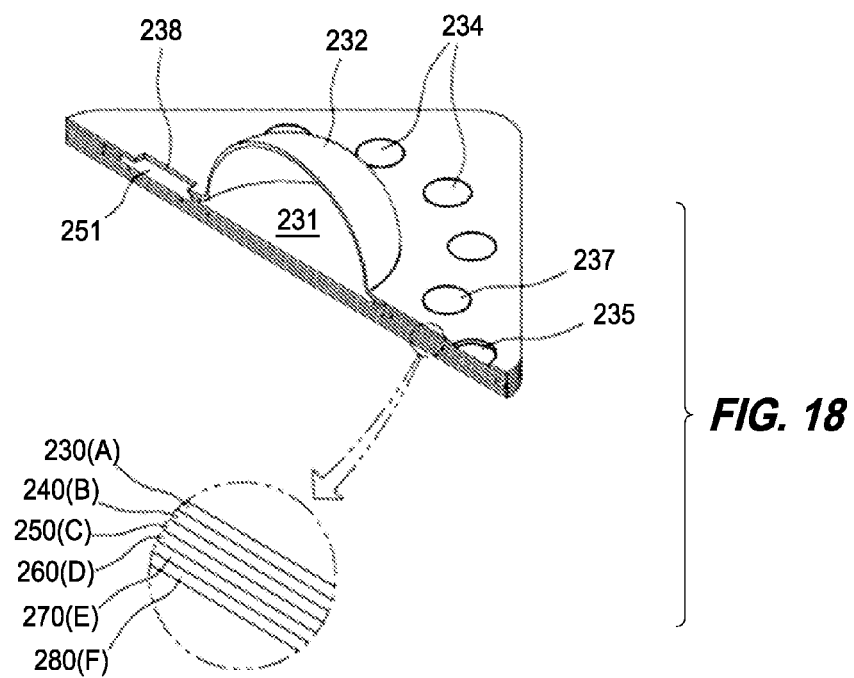
FIG. 18 is a perspective view illustrating a precise critical temperature indicator in detail according to another embodiment of the invention.
Figure 19:
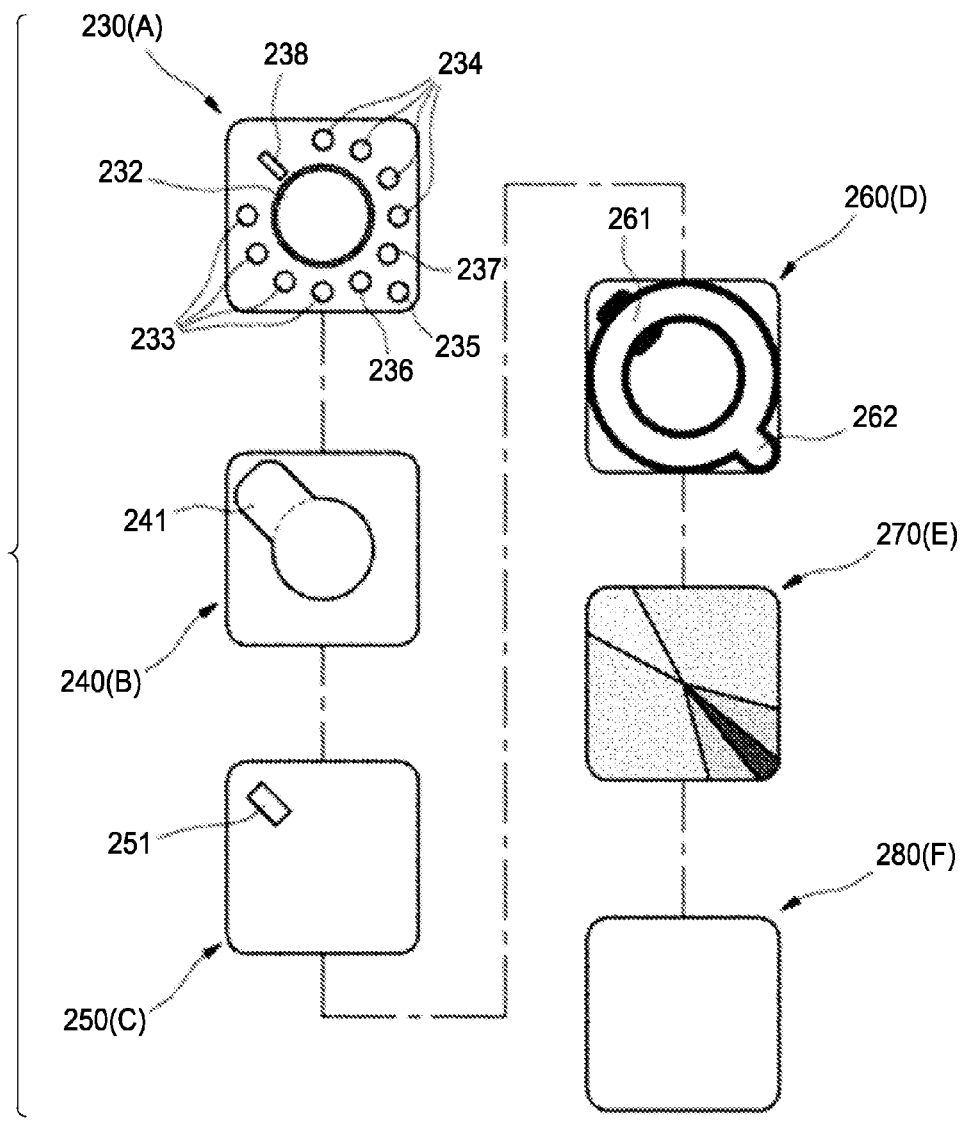
FIG. 19 is a series of cross-sectional views illustrating parts of a precise critical temperature indicator, respectively, according to another embodiment of the invention.

As shown in FIGS. 18 and 19, according to another embodiment of the invention, a precise critical temperature indicator is made into one body including a development material member 230 positioned on the upper portion thereof. The development material member 230 made of PE and PVC comprises an activation button 232 including a molding layer A that is projected in a semi-sphere form at the center to receive a development material 231 therein and a plurality of indication windows formed in an arc around the circumference of the activation button 232 including left indication windows 233 formed in a certain gap leftward and right indication windows 234 formed in a certain space rightward so as to enable the temperature indication to be developed in both directions.

An adhesive member 240 of an adhesive layer B to adhere an intermediate member including a boundary layer C as described thereafter thereto is applied to the lower portion of the development material member 230. The adhesive member 240 includes a space not applying adhesives to regions corresponding to the activation button 232 and a speed adjustment window 251 to function as a migration passage 241 of a development medium.

The intermediate member is positioned between the development material member 230 and the development medium member 250 and formed as a migration passage, on the corner of which the speed adjustment window 251 is formed.

The development medium member 250 made of a micro porous film includes a development passage 261 in a ring shape connected to the speed adjustment window 251, and a final development region 262 terminated at the development passage 261 opposite to the speed adjustment window 251 in a diameter line is divided. The development medium member 250 is heat-pressed together with the development material member 230 with the development material 231 filled up in the activation button 232.

The precise critical temperature indicator further comprises a print member 270. The print member 270 includes a region corresponding to the speed adjustment window 251 printed by a red color, the development passage 261 including an indication region of the left and right indication windows 233 and 234 by a blue color, both sides of the indication window 235 at the final development region by a yellow color and an indication window of the final development region 262 by a red color. The print member 270 may be formed on another layer or a sealing member 280 including a base layer F.

The development material member 230 is made of transparent PTP or vinyl coating film, and the intermediate member is made of PE, PP, and Polyolefin or aluminum material.

Figure 20:
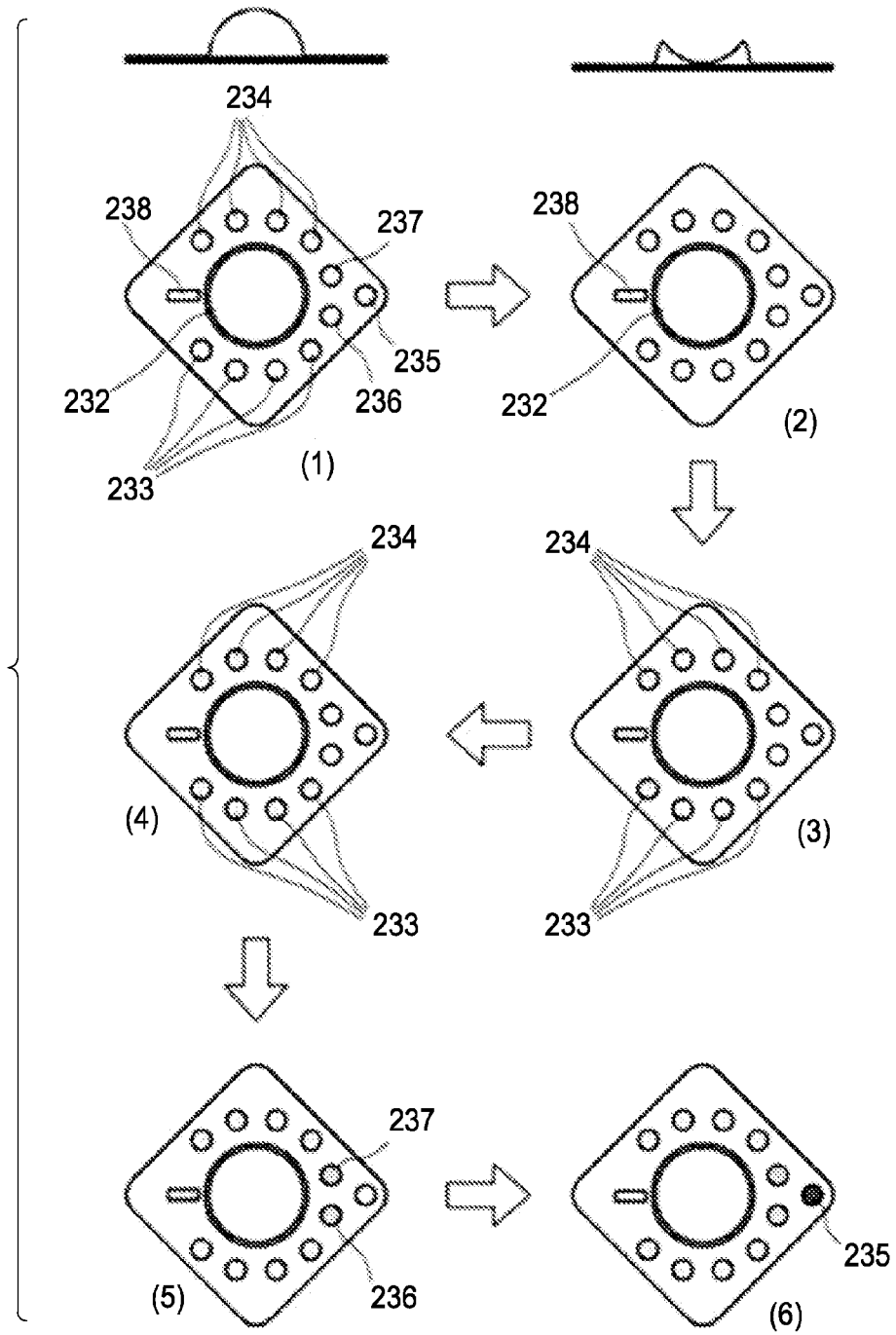
FIG. 20 is a series of cross-sectional views illustrating the assembly of a precise critical temperature indicator and the operation state thereof in use according to another embodiment of the invention.

As shown in FIG. 20, the precise critical temperature indicator is standing by ready to operate with being attached to freezing or refrigerating products (1). As the activation button 232 is pressed, the development material 231 is migrated along the migration passage 241 and through the speed adjustment window 251 to the indication window 238 to show the beginning of a system's operation (2). Thereafter, the development material 231 is applied to both ends of the development passage 261 and migrated in both directions to start the development thereof (3). The development material 231 continues to be developed according to a time elapse to get the left and right indication windows 233 and 234 to appear in the blue color (3) and (4). In the process of the continuing development, the indication windows 236 and 237 appear in the yellow color to warn users (5) and are further advanced to appear in the red color and indicates that the freezing or refrigerating products are in the danger range. It means that the precise critical temperature indicator enable the temperature indication from the beginning step to the final step.

A manufacturing method of the precise critical temperature indicator comprises steps of: firstly, preparing a seal sheet including a plurality of seal members, a print sheet member including a plurality of print members 270, a development medium sheet made of a micro porous film and including a plurality of development medium members to form the development passage 261 and an intermediate member sheet including a plurality of boundary layers to form the speed adjustment windows 251, respectively; heat-depositing these sheets by the reference of the heat-adhesion portion to form the development passage 261 and to combine them in a single sheet; applying an adhesive agent to all portions of the combined sheet except for an inner circle portion and indication windows of the development passage 261 of the development material 231 on a plurality of intermediate members 250; and heat-depositing a sheet including a plurality of the development material members 230 having a molding layer in the form of a semi-sphere to receive the development material 231 on the adhesive layer.

Figure 21:
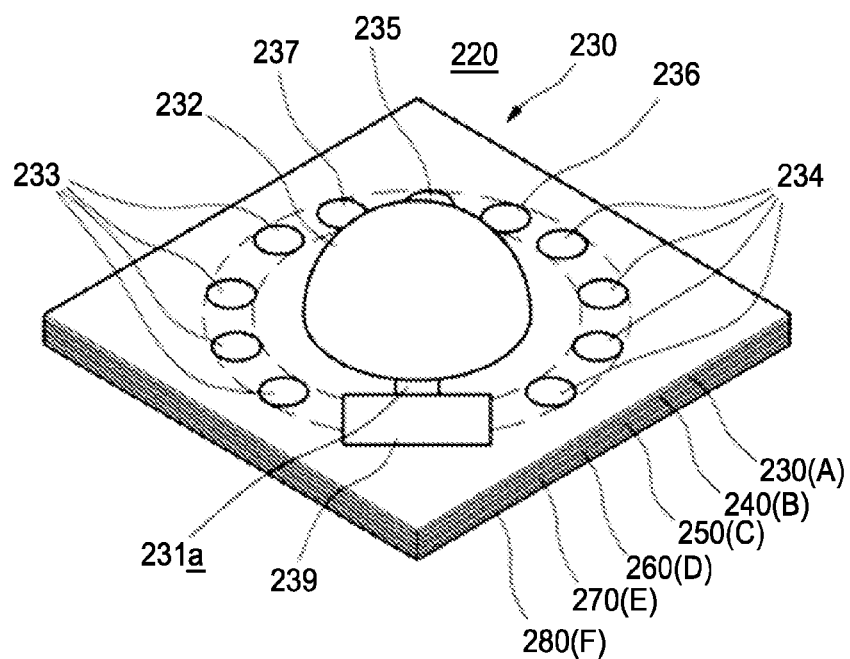
FIG. 21 is a whole perspective view illustrating a precise critical temperature indicator in detail according to another embodiment of the invention.
Figure 22:
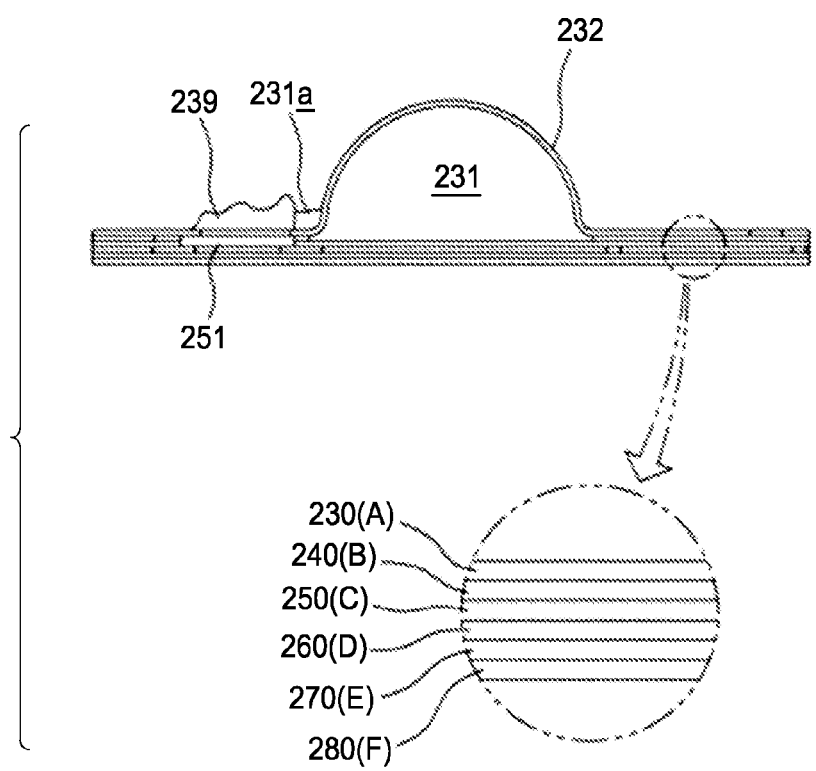
FIG. 22 is a side cross-sectional view illustrating a precise critical temperature indicator in detail according to another embodiment of the invention; and, FIG. 23 is a side cross-sectional view illustrating a precise critical temperature indicator in detail according to another embodiment of the invention.

According to another embodiment of the invention, as shown in FIGS. 21 and 22, a precise critical temperature indicator 20 is made into one body. The precise critical temperature indicator 20 is similar to the first embodiment except for a development material member 230, the detailed description of which is deleted herein. The development material member 230 will be explained on priority basis. The development material member 230 includes an activation button 232 filling up a development material 231 therein and having a molding layer projected in a semi-sphere form at the center thereof and a plurality of indication windows including left indication windows 233 spaced in a certain gap leftward there from and a warning indication window 237, right indication windows 234 spaced in a certain gap rightward there from and other warning indication window 236 and a danger indication window 235 to enable the temperature indication to be developed in both directions. The activation button 232 includes a migration passage 231a formed adjacent thereto and extended horizontally in a predetermined distance there from to enable the flow of a development material and a buffer portion 239 to be connected to the migration passage 231a and constituted as a compartment to receive the development material 231, temporally, and absorb shock due to the pressing force of the activation button 232.

On the other hand, it is desirable that the activation button 232 may receive the development material 231 mixed with an ink adding a fat-solubility pigment therein.

Figure 23:
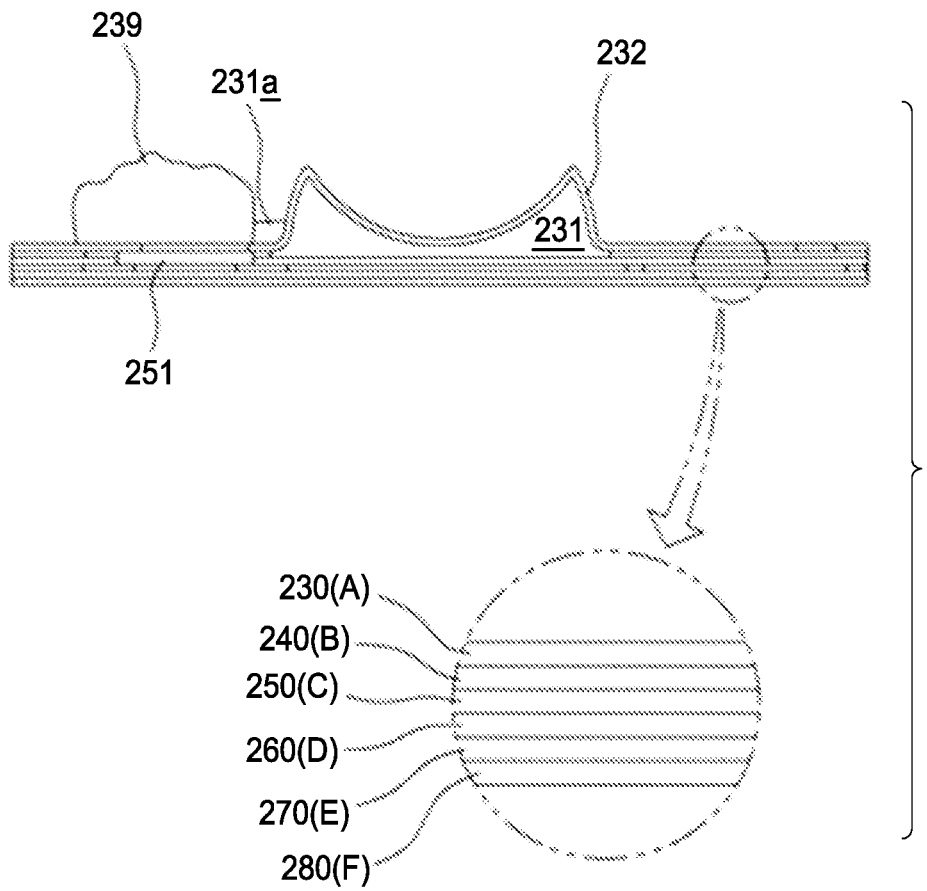

Therefore, as shown in FIG. 23, the development material member 230 enables the development material 231 to pass through the migration passage 231a to the buffer portion 239 including a hollow compartment, first, as the activation button 232 is pressed. At that time, the buffer portion 239 absorbs some shock due to the pressing pressure. Herein, the migration passage 231a includes a weak portion having a relative small contact region between the activation button 232 and the buffer portion 239.

A manufacturing method of a precise critical temperature indicator according to another embodiment of the invention comprises steps of preparing a seal sheet including a plurality of seal members 280, a print member sheet including a plurality of print members 270 for the temperature indication, a development medium sheet including a plurality of development medium members forming development passages 261 made of a micro porous film, an intermediate member sheet including a plurality of boundary layers C forming a speed adjustment window 251, respectively, combining these sheets in single sheet heat-depositing by the reference of heat-deposition portions forming the development passages 261 of the development material 231, applying adhesive agent to all over portions except for the inner circle portion of the development passages 261 and indication windows on a plurality of intermediate members and heat-depositing a sheet including a plurality of development material members forming a molding layer in a semi-sphere to receive the development material 231.

The invention claimed is:

1. A precise critical temperature indicator comprising:
a temperature sensor including an upper portion made of a transparent material, in which the upper portion includes a container sealed by a seal member to receive a development material therein, a support portion supporting the container, first and second cylindrical portions formed in layers of concentric circle having diameters different from each other, the first cylindrical portion including a circular plate formed away in a certain gap from the circumference thereof, the second cylindrical portion receiving the container therein and a lower portion including a development medium member for arranging the support portion on a seat portion under the lower surface of the upper portion and sealing the lower surface thereof adjacent to the development medium member and applying an adhesive agent thereto to be attached to freezing and refrigerating products;
an indication portion made of an opaque material and including at least one indication window formed on the cylindrical portion of the upper portion; and
a cap portion made of an opaque material and sealing the lower surface thereof, in which an activation button is fitted into the center hole thereof and the temperature sensor is received therein.

2. A precise critical temperature indicator according to claim 1, in which:
the temperature sensor furthermore including the support portion positioned around the seat portion of the development medium member and an extension portion extended in a circle or multi-angle forms from the seat portion, to the upper and lower surfaces of which a predetermined pigment is applied.

3. A precise critical temperature indicator comprising:
a development material member including an activation button, a cap portion projected at the center to receive a development material therein, an extension portion horizontally extended from the activation button and forming a migration passage of the development material on the diameter line thereof, a first compartment bordering at a concentric circle with the activation button on the extension portion and applying an adhesive agent to the outer circumference thereof, a second compartment projecting in a concentric circle adjacent to the circumference of the first compartment and an upper portion extended from the circumference of the second compartment and forming at least one indicating window;
a development medium member positioned on the lower surface of the upper portion and including the migration passage of the development material formed in a region of anyone of a concentric circle, a threaded form or a zigzag form; and
a lower portion including a seat to seal the upper portion adjacent to the development medium member.

4. A precise critical temperature indicator according to claim 3, in which the temperature sensor includes the first and second compartments isolating the development material from the development medium only for a moment and the development medium migration passage formed by first and second print layers on the development medium.

5. A manufacturing method of the precise critical temperature indicator comprising steps of:
preparing a plurality of development material members including an activation button formed in a predetermined dome shape on a single sheet and first and second compartments and a passage;
filling up a development material into the activation button, the first compartment and the passage;
overlapping a lower sheet including a plurality of development medium members on another single sheet and combining them; and
applying a synthetic ink such as a polyester ink, etc. to a predetermined shape of first and second print layers to form a development material contacting portion and a development material migration passage.

6. A precise critical temperature indicator comprising:
a development material member including an activation button filling up a development material therein and constituted as a molding layer projected in a semi-sphere at the center and including a plurality of indication windows formed in an arc on the circumference of the activation button; and
a development medium member including an intermediate member sheet and an migration passage,
wherein the intermediate member sheet is positioned between the development material member and the development medium member, and has a plurality of boundary layer to form the speed adjustment window,
wherein the migration passage is connected to the speed adjustment window of the development of the development material,
in which the development material is introduced into and filled in the speed adjustment window by the activation button, and migrated along a migration passage of the development medium member coupled with both sides of the plurality of indication windows, thereby indicating a critical temperature detection through the plurality of indication windows.

7. A precise critical temperature indicator according to claim 6, in which:
an adhesive agent is not applied to regions corresponding to the activation button and the speed adjustment window on an adhesive agent layer between the development material member and the boundary layer, and the development medium member made of a micro porous film is heat-pressed in the form of a circle ring with a region formed by overlapping the migration passage of the development material with the speed adjustment window and an indication portion region formed adjacent to the migration passage on the diameter line of the speed adjustment window.

8. A precise critical temperature indicator according to claim 6, in which:
the precise critical temperature indicator furthermore comprises a print layer printing regions corresponding to the speed adjustment window and the indication windows of the indication portion are printed by a red color, both sides on the red color of the indication is window printed by a yellow color, and other region is printed by a blue color thereby to let the operating start time point and the exposure time point of the critical temperature to be indicated.

9. A manufacturing method of the precise critical temperature indicator comprising steps of:
preparing a seal sheet made of a silver film and including a plurality of base layers, a print sheet member for the temperature indication, a development medium member sheet made of a micro porous film and including a plurality of development medium members forming a development passage and an intermediate member sheet including a plurality of boundary layers to form speed adjustment windows, respectively;
heat-depositing these sheets by the reference of the heat adhesion portion forming the development passage to combine them in a single sheet;
applying an adhesive agent to all portions of the combined sheet except for an inner circle portion of the development passage of the development material on a plurality of intermediate members and indication windows; and,
heat-depositing on the adhesive layer a sheet including a plurality of development material members having a molding layer in the form of a semi-sphere to receive the development material.

10. A precise critical temperature indicator comprising:
a development material member including an activation button made into a molding layer to be projected in a semi-sphere from the center thereof and for receiving a development material, an migration passage horizontally extended in a predetermined distance from the activation button of the molding layer, a buffer portion connected to the migration passage and made into a compartment to receive the development material, temporally, and absorb shock due to the pressing force of the activation button and a plurality of indication windows formed in an arc on the circumference of the activation button;
a boundary layer including a speed adjustment window connected to the migration passage and for introduce the development material into the speed adjustment window;
a development medium member made of a micro porous film and for forming a region except for the development passage extended from the migration passage into a heat-adhesion portion;
a print layer including the speed adjustment window and the indication window of the indication portion printed by a red color, both sides on the red color of the indication window printed by a yellow color and other region printed by a blue color; and,
a base layer positioned on the bottom of the precise critical temperature indicator, thereby letting the operating start time point and the exposure time point of the critical temperature to be indicated on the indication windows on the top of the precise critical temperature indicator.

11. A precise critical temperature indicator according to claim 10, in which:
the development material member includes the indication window formed in the form of a circle or a square, etc. on the circumference of the activation button, a development passage having a shape the same as that of the indication window horizontally extended toward an outlet at the center from the activation button to let the development material to be flowed there into and buffer portions including at least one compartments- connected to the development passage to receive the development material, first, and absorb some shock due to the pressing force of the activation button.

12. A manufacturing method of the precise critical temperature indicator comprising steps of:
preparing a seal sheet including a plurality of base layers made of a silver foil, a print member sheet including a plurality of print members for a temperature indication, a development medium sheet including a plurality of development medium members forming development passages made of a micro porous film, an intermediate member sheet including a plurality of boundary layers forming a speed adjustment window, respectively;
heat-depositing these sheets by the reference of heat-deposition portions forming the development passages of the development material to be combined in a single sheet;
applying an adhesive agent to all portions except for an inner circle portion of the development passages and indication windows on the plurality of boundary layers of the combined sheet; and
heat-depositing on the adhesive layer a sheet including a plurality of development material members and constituted as a molding layer in a semi-sphere to receive the development material at the center thereof, a migration passage horizontally extended in a predetermined distance from the activation button of the molding layer, a buffer portion connected to the migration passage and made into a compartment to receive the development material, temporally, and absorb shock due to the pressing force of the activation button and the plurality of indication windows formed in an arc on the circumference of the activation button.

* * * * *